Nov. 17, 1942.    B. S. AIKMAN    2,302,486
FLUID PRESSURE BRAKE CONTROL MEANS
Filed Oct. 31, 1941    2 Sheets-Sheet 2
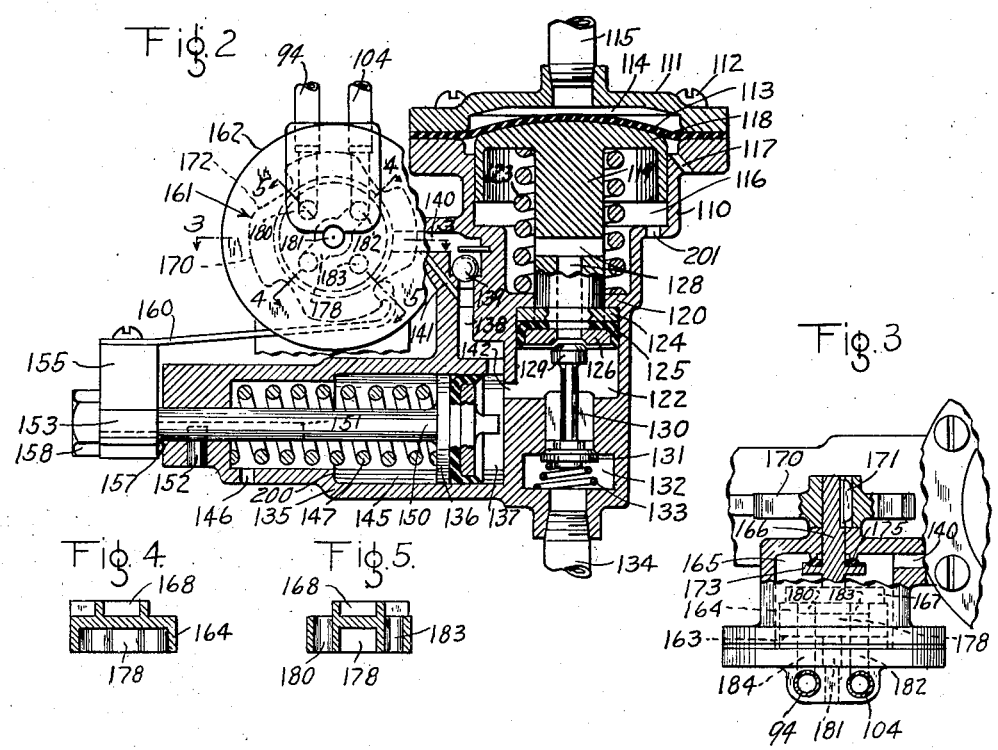
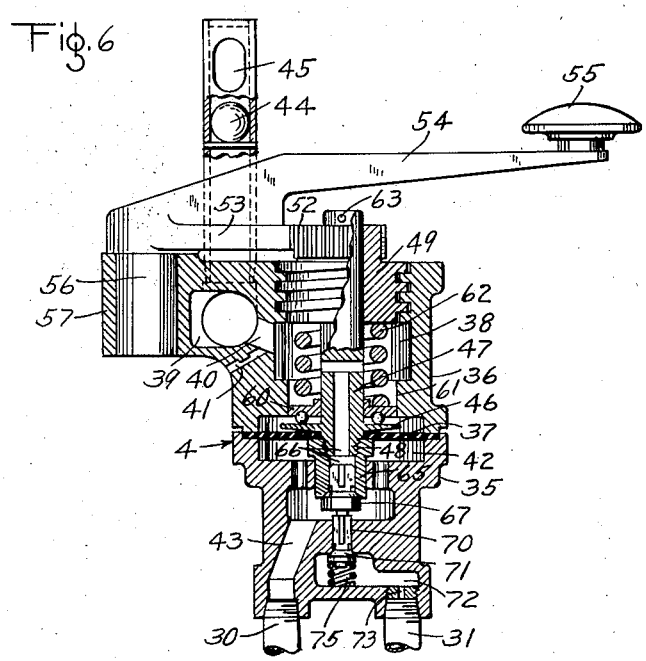
INVENTOR
BURTON S. AIKMAN
BY
ATTORNEY Patented Nov. 17, 1942

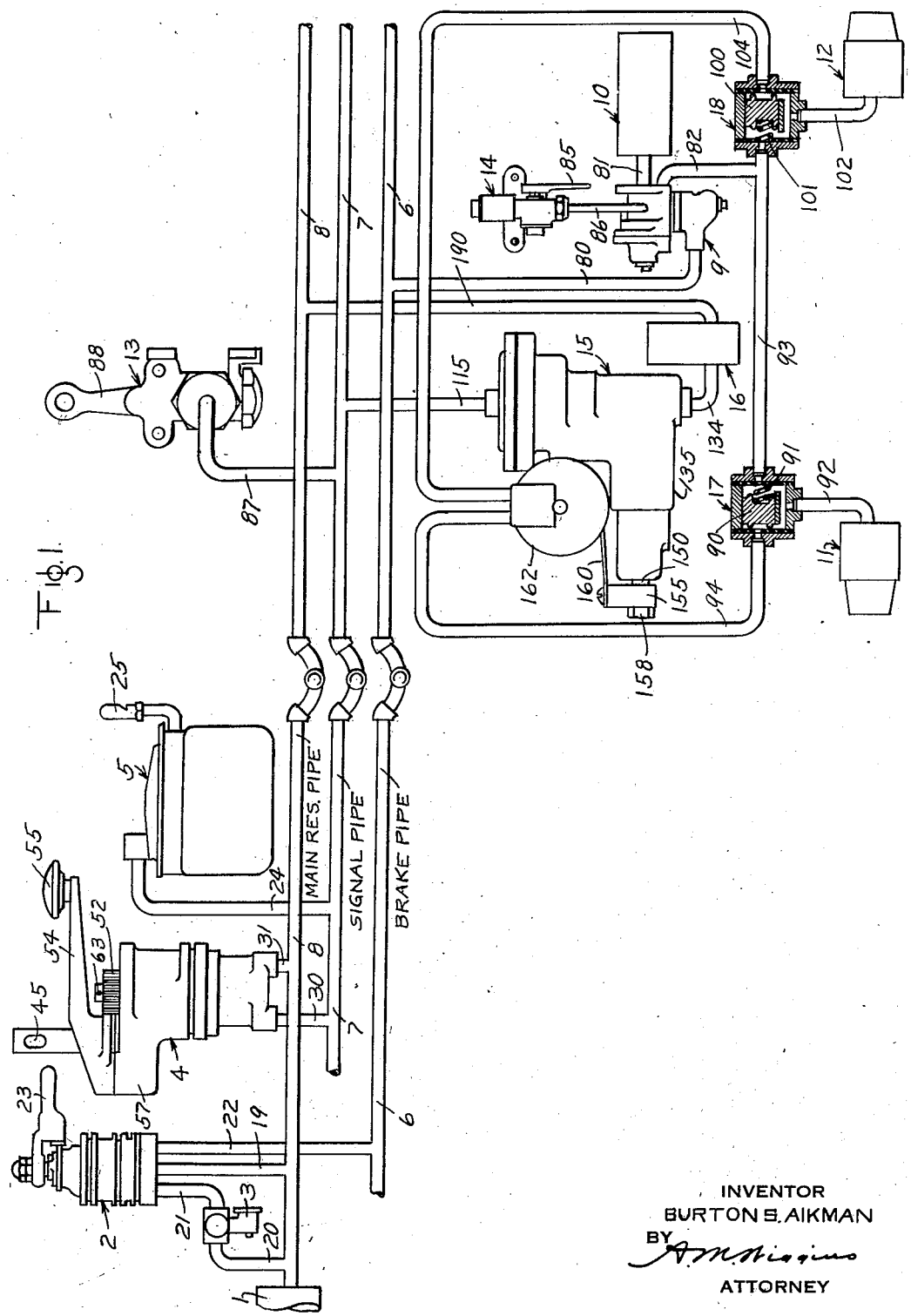

2,302,486

UNITED STATES PATENT OFFICE 2,302,486

FLUID PRESSURE BRAKE CONTROL MEANS

Burton S. Aikman, Wilkinsburg, Pa., assignor to The Westinghouse Air Brake Company, Wilmerding, Pa., a corporation of Pennsylvania Application October 31, 1941, Serial No. 417,334

52 Claims. (Cl. 303—13)

This invention relates to brake systems for controlling a plurality of sets of brakes and more particularly to railway vehicle brake systems of the type having a set of brakes for each truck, each wheel or each wheel and axle assembly of the vehicle.

The invention has for its principal object the provision of a novel brake system operative to either control all the sets of brakes together or to alternately control the sets of brakes separately, so that one set will not be applied twice in immediate succession.

Another object of the invention is to provide a railway vehicle fluid pressure brake system having at least two sets of brakes, a signal pipe and control means operative automatically in response to variation in signal pipe pressure above the normal pressure carried to cause first one and then the other of said sets of brakes to function by turns to brake the vehicle. A further feature resides in the provision of a brake valve device which normally charges the signal pipe to the normal pressure and maintains it charged to the normal pressure and which is operative to effect the variations in the signal pipe pressure above the normal pressure.

Another object is to provide a railway vehicle fluid pressure brake system having two brake cylinders, each brake cylinder being associated with a separate set of brakes. The system includes a brake pipe and a brake controlling valve device operative upon a reduction in brake pipe pressure to supply fluid under pressure to both brake cylinders to apply all the vehicle brakes, and operative upon a subsequent increase in brake pipe pressure to release fluid under pressure from both brake cylinders to release all of the vehicle brakes, and a brake valve device operative to effect the variations in brake pipe pressure. In addition, the system also provides another train pipe and another brake controlling valve device which is operative upon an increase in the pressure of fluid in said other train pipe at the time the aforementioned brake valve device is in release position to supply fluid under pressure to one of said brake cylinders, to apply one set of brakes, and operative upon a reduction in the pressure of fluid in said other train pipe to release fluid under pressure from the brake cylinder and operative upon a subsequent increase in the pressure of fluid in said other train pipe for supplying fluid under pressure to the other brake cylinder, to apply the set of brakes associated with this brake cylinder; and the system also includes a second brake valve device for varying the pressure of fluid in said other train pipe.

In a train equipped with the usual fluid pressure brake equipment either a service or an emergency application of the brakes may be effected to bring the train to a stop. It is understood by those skilled in the art that a train traveling at high speed may be brought to a stop in a shorter distance by effecting an emergency application of the brakes than by a service application of the brakes. This is due to the higher braking forces employed on the vehicle during an emergency brake application. However, recent train brake tests have disclosed that lower vehicle wheel temperatures result when the train is brought to a stop by effecting an emergency application of the brakes than when brought to a stop by effecting a service application of the brakes, for the reason that less heat is transferred to the body of the car wheel during the stop of shorter duration even though the surface of the tread of the vehicle wheel may be at a higher temperature than that reached in effecting a service application.

It is therefore a further object of the invention to provide a railway vehicle fluid pressure brake system having at least two sets of brakes, a signal pipe and control means operative automatically in response to variations in signal pipe pressure to cause first one and then the other of said sets of brakes to function, alternately, to brake the vehicle, which may thus employ high braking forces during the braking interval of each set of brakes.

Other objects and advantages will be apparent from the following detailed description of the invention.

In the accompanying drawings,

Fig. 1 is a diagrammatic view, partly in section, of a braking system embodying my invention.

Fig. 2 is a diagrammatic sectional view of a control valve device shown in outline in Fig. 1 of the drawings.

Fig. 3 is a fragmentary sectional view taken on the line 3—3 of Fig. 2 looking the direction of the arrows.

Fig. 4 is a fragmentary sectional view taken on the line 4—4 of Fig. 2.

Fig. 5 is a fragmentary sectional view taken on the line 5—5 of Fig. 2.

Fig. 6 is a diagrammatic sectional view of the self-lapping brake valve device shown in outline in Fig. 1 of the drawings.

In Fig. 1 of the drawings the equipment for the locomotive or leading car of a train and one trailing car of the train has been shown, but it will be understood that all the other trailing cars in the train may be equipped with similar car equipment.

The locomotive or leading car equipment, so far as the invention is concerned, may comprise as shown in Fig. 1 of the drawings, a main reservoir 1, an engineers automatic brake valve device 2, a feed valve device 3 of usual construction for supplying fluid at a reduced pressure from the main reservoir 1 to the brake valve device 2, a self lapping brake valve device 4 and a signal valve device 5. In addition to the above valve devices the locomotive or leading car is provided with a brake pipe 6, a signal pipe 7 and a main reservoir pipe 8, each of which may be connected in the usual manner to corresponding pipes on the trailing car or cars, thus the pipes are in effect continuous throughout the length of the train.

On each trailing car there is provided a brake equipment comprising the usual triple valves device 9, an auxiliary reservoir 10, brake cylinders 11 and 12, a car discharge or trainman's signal controlling valve device 13 and a brake cylinder pressure retaining valve device 14. In addition a control valve device 15 which according to its functions may be a combined relay and selector valve device is provided, which is adapted to be controlled by the pressure in the signal pipe for alternately applying and releasing the brakes on the vehicle controlled by brake cylinders 11 and 12, a supply reservoir 16 and two double check valve devices 17 and 18.

Considering now more in detail the devices referred to above, which constitutes the train equipment, the main reservoir 1 which is of the usual construction is adapted to be supplied with fluid under pressure in any suitable manner and is connected to the feed valve device 3, by means of main reservoir pipe 8 and a connecting pipe 20.

The engineers automatic brake valve device is connected to the feed valve device 3 and to the brake pipe 6 by means of pipes 21 and 22, respectively, and is also connected to the main reservoir 1 by means of pipe 8 and a branch pipe 19. This device may be of the usual well known construction comprising a casing having a rotary valve chamber therein in which is mounted a rotary valve which is operated by means of a handle 23 for causing either an increase or a decrease in the pressure of fluid in the brake pipe 6 for effecting either an application or a release of the brakes on the cars throughout a train.

The signal valve device 5 is connected by means of a branch pipe 24 with the signal pipe 7 and may be of any preferred construction familiar to those skilled in the art, such for example as the signal valve device covered by Patent 2,028,605, issued to E. E. Hewitt, January 21, 1935, which as is well known, responds to a reduction in the pressure carried in the signal pipe 8 to cause a signal whistle 25 to sound.

The self-lapping brake valve device 4 is connected to the main reservoir pipe 8 and to the signal pipe 7, by means of pipes 30 and 31, respectively, and is for the purpose of maintaining, in its normal or release position, the desired pressure in the signal pipe and, in its application range, varying the pressure in the signal pipe within certain limits above the desired normal pressure carried for controlling the brakes in the manner hereinafter described.

This self-lapping brake valve device, as shown in Fig. 6 of the drawings, may comprise a body casing 35 and a cap portion 36 which is removably secured to the casing by any suitable means. Clamped between the casing and cap is a flexible diaphragm 37 having at one side a chamber 38 which is connected to a chamber 39 by way of a passage 40, which passage is connected through a restricted passage 41 to the atmosphere, and having at the other side of the diaphragm 37 a chamber 42 which is connected by way of a passage 43 to the pipe 30.

Secured to the cap portion of the brake valve device 4 and extending upwardly therefrom is a tubular member having one end in connection with chamber 39 and having its other end closed. Contained in this member is a ball 44 which is normally supported by a pin carried by the member. This ball is movable vertically under the influence of fluid under pressure within the member to a point where it may be seen through a transparent window 45 with which the member is provided.

Contained in chamber 38 is a follower 46 having a stem 47 projecting upwardly from one side thereof and having a short stem 48 projecting downwardly from the other side through a central opening provided in the diaphragm. The stem 47 is round in cross-section and extends through a central opening in a rotatable and vertically movable control member 49 having screw-threaded connection with the upper end of the cap portion 36 of the casing to effect vertical movement of the member when the member is rotated. This control member is provided with a pinion 52 which meshes with a gear segment 53 carried by a rotatable handle 54 having at one end a hand piece 55 adapted to be grasped by the operator, and having at its other end a downwardly extending portion 56 which is round in cross-section and which is journaled, in a laterally projecting portion 57 of the cap 36.

Contained in chamber 38 and surrounding the stem 47 is an annular ball bearing spring seat 60 which rests on the upper surface of the follower 46 and which is slidably guided both vertically and laterally by an annular wall 61 of the cap portion 36. Interposed between and operatively engaging the spring seat 60 and the inner end of the control member 49 is a control spring 62. It will here be noted that the ball bearing spring seat 60 provides for the free rotation of the control spring, so that the tendency of the spring to wind up when the control member 49 is rotated is reduced to a minimum and therefore the danger of the spring acting to return the handle from any control position to which it has been moved is eliminated.

The upper end portion of the stem 47 projects above the pinion 52 and is provided with a transversely extending pin 63 which may project from both sides of the stem and which is adapted to be engaged by the adjacent end face of the pinion when, as will hereinafter fully appear, the handle 54 is moved to full application position. In all other positions the end face of the pinion does not engage the pin.

Contained in chamber 42 and slidably guided by the casing 35 is a tubular sleeve 65 which has screw-threaded connection at its upper end with the stem 47 of the follower 46, said sleeve clamping the flexible diaphragm to the follower and forming an extension of the stem 47. The extension 65 and followers are provided with a passage 66 which leads to the chamber 38. Formed on the lower end of the sleeve 65 and encircling the passage 66 in a valve seat on which an exhaust valve 67 is adapted to seat to cut off communication from the chamber 42 to the exhaust passage 66. This valve engages the end of the fluted stem 70 of a pilot supply valve 71 contained in a chamber 72 which is connected through a choke 73 to the pipe 31, said valve 71 being at all times urged toward its seat by the action of a light coil spring 75.

The brake valve handle 54 is movable through an application and release zone one end of said zone being running position and the other being full service application position. In this connection it will be noted that with the handle 54 in running position the control spring 62 will be compressed a predetermined degree for maintaining in a manner hereinafter described, fluid under pressure at a predetermined valve in the chamber 42 and connected signal pipe 3.

Considering now more in detail the valve device employed in car equipment, the triple valve device 9 is of the usual well known construction and is adapted to be controlled by variations in brake pipe pressure initiated through the manipulation of the automatic brake valve device 2. Since this type of valve device is so well known it has not been shown in detail in the drawings but may be briefly described as comprising a casing having a piston chamber connected to the brake pipe 6, through a brake pipe branch pipe 80, and containing a piston having a stem for operating a valve mechanism which is contained in a valve chamber connected to the auxiliary reservoir 10 by way of a pipe 81.

It will be understood by those skilled in the art that this valve device operates upon a reduction in brake pipe pressure to supply fluid under pressure from the auxiliary reservoir 10 to a brake cylinder control pipe 82 to initiate an application of the car brakes and upon an increase in brake pipe pressure to release fluid under pressure from the pipe 82 to effect a release of the car brakes and to charge the auxiliary reservoir.

The brake cylinder pressure retaining valve device 14 is connected by means of a pipe 86 with the exhaust port of the triple valve device 9 and is of the type employed to insure safe control of trains operating on long grades where one or more applications of the brakes may be required and is of the usual well known construction. This type of valve device is well known and for that reason may be described as comprising a casing having one or more spring weighted check valves and a rotary plug or key valve operable, according to the positioning of a handle 85, to divert the flow of air discharged from the brake cylinder past one or more check valves to the atmosphere, or through an unrestricted passage.

The trainman's signal valve device 13 is connected to the signal pipe 7 through a pipe 87 and is of the well known type used in train air signal systems such as shown and described in Westinghouse Air Brake Company's Instruction pamphlet No. 5061, dated March, 1939. In view of this it may be briefly described as comprising a handle 88 which when moved in either direction from a vertical position actuates a spring weighted valve, which when open is adapted to vent the pipe 87 and thereby the signal pipe to the atmosphere.

The double check valve device 17 contains a movable piston 90 which is subject on one side to the combined pressures of fluid in a chamber and a biasing spring 91 and subject on the other side to pressure of fluid in a chamber. This check valve is provided to control communication between a pipe 92 leading to the brake cylinder 17 and either a pipe 93 opening at one end of said check valve which pipe is connected to the pipe 32 or a pipe 94 opening at the opposite end leading to the control valve device 15. In the position shown in the drawings, Fig. 1, the pipe 92 is disconnected from pipe 94 and connected to pipe 93.

The double check valve device 18 is substantially the same as check valve 17, having a movable piston 100 subject on one side to the combined pressures of fluid in a chamber and a biasing spring 101 and subject on the other side to pressure of fluid in a chamber. This check valve is provided to control communication between a pipe 102 leading to the brake cylinder 12 and either the pipe 93 opening at one end of said check valve and connected to the pipe 82 or a pipe 104 opening at the opposite end and connected to the control valve device 15. The purpose of and mode of operation of these check valve devices will be described in the following description of operation of the equipment.

The control valve device 15 may comprise a body casing 110 and a cover portion 111 which is removably secured to the casing by means of screws 112. Clamped between the casing and cover is a flexible diaphragm 113 having at one side a chamber 114 which is in constant open communication with the signal pipe 7 through a branch pipe 115, and having at the opposite side a chamber 116 which is connected through a port 201 to the atmosphere.

Contained in chamber 116 is a follower 118 having a stem 119 projecting downwardly. The stem 119 is round in cross-section and extends through and is slidably guided in a central opening provided in a partition wall 120 of the casing 110, which wall separates chamber 116 from a chamber 122. Interposed between and operatively engaging the follower 118 and an annular spring seat formed on the wall 120 is a control spring 123.

Contained in chamber 122 and secured to the lower end of the stem 119 is a piston assembly 124 comprising a piston packing cup attached thereto by means of a follower 126 which cup 125 is adapted to prevent leakage of fluid from chamber 122 to chamber 116 past the stem 119.

The follower 126, the packing cup 125 and the stem 119 are provided with a passage 128 which leads to the chamber 116. Formed on the lower face of the follower 126 and encircling the passage 128 is a valve seat which is adapted to engage with an exhaust valve 129 to cut off communication from the chamber 122 to the exhaust passage 128. This valve is secured to the end of a stem 130 of a supply valve 131 contained in a chamber 132 which is connected through a pipe 134 to the supply reservoir 16. Contained in chamber 132 and operatively engaging the supply valve 131 and the inner end wall of the casing is a light coil spring 133 which acts at all times to urge said valve toward its seat.

The body casing 110 is provided with a laterally projecting hollow portion 135 in which there is operatively mounted a piston 136, having at one side thereof a chamber 137 which is connected through a passage 138, containing a non-return check valve 139, to a passage 140, which passages 138 and 140 are also connected together by a restricted passage 141 arranged to by-pass the check valve 139. This chamber is also in constant open communication with the chamber 122 by means of a port 142. At the opposite side of the piston 136 there is a chamber 145 which is connected through a port 146 to the atmosphere.

Contained in chamber 145 and interposed between and operatively engaging one side of the piston and the end wall of the chamber is a release spring 147 which, at all times, tends to urge the piston 136 to its release position, as shown in Fig. 2 of the drawings.

A piston stem 150 extending to the left from the piston 136 through chamber 145, is slidably guided in the end wall of the casing portion 135. This stem is provided with a longitudinally extending groove or recess 151 into which extends a pin 152, carried by the casing to prevent turning of the stem and thereby the piston in their respective bores. The outer end portion of the stem extends beyond the outer wall of the casing portion 135, as shown in Fig. 2 of the drawings, which end portion 153 is reduced in diameter and screw-threaded.

An operating member 155 is mounted on the end portion 153 of the stem 150 and is keyed thereto to prevent relative motion between the stem and the member. As shown in Fig. 2 of the drawings the member abuts the shoulder 157 resulting from the reduction in the diameter of the stem and is maintained in this position by a nut 158 which has screw-threaded engagement with the outer end of the stem.

The operating member 155 is provided with a flexible arm 160 for actuating a rotary selector valve mechanism 161 contained in a portion or section 162 of the casing 110, the free end of the member being hooked for operative engagement with the valve mechanism.

The rotary selector valve mechanism 161 may, as best shown in Fig. 3 of the drawings, comprise a rotary or regulating valve seat 163 for a rotary selector valve 164 contained in a chamber 165, which chamber is in constant open communication with the passage 140. The rotary selector valve 164 is adapted to be operated by an actuating stem 166 which, at its lower end, is provided with a tapered key 167 constructed and arranged to engage with a tapered recess or mortise 168 provided on the top side of the rotary selector valve 164. The upper end of the actuating stem 166 extends to the exterior of the casing and is radially connected to an element 170, by means of a key 171, which element is provided with teeth 172 adapted to be engaged by the hooked end of the arm 160. Intermediate its ends, the stem 166 is provided with a collar 173 for supporting a suitable packing 175 which is adapted to prevent leakage of fluid under pressure from the chamber 165 to the atmosphere past the stem 166.

As best shown in Figs. 4 and 5 of the drawings, the rotary valve 164 is provided with a cavity 178 which in certain positions of the valve serves, as will appear in the description of the operation of the equipment, to connect certain ports in the valve seat 163. The rotary valve is further provided with parts 180 and 183 which are arranged at either side of the cavity 178, as shown in Figs. 3 and 5 of the drawings, which ports pass directly through the valve and allows fluid under pressure in chamber 165 to flow to the seat 163 for the rotary valve 164.

The seat 163 is provided with a port 182 and a port 184 which are connected to the pipes 104 and 94 respectively, and is also provided with a central exhaust port 181.

With the rotary valve 164 in the position shown in Figs. 2 and 3 of the drawings the port 180 in the rotary valve aligns with the port 184 in the seat so that communication is established between the chamber 165 and the pipe 94 by way of through port 180 in the rotary valve and port 184 in the seat. At the same time one end of the cavity 178 in the rotary valve aligns with the port 182 in the seat so that communication is established between pipes 104 and the atmosphere by way of port 182 in the seat, cavity 178 in the rotary valve and exhaust port 181 in the seat. When the rotary valve 164 is rotated in a clockwise direction through an arc of 90 degrees in a manner hereinbefore described, the rotary valve will function to alternate the connections above described, that is, cut off communication between the chamber 165 and pipe 94 and establish communication between this pipe and the atmosphere by way of port 184 in the seat, cavity 178 in the rotary valve and exhaust port 181 in the seat. At the same time movement of the rotary valve to this position cuts off communication from pipe 104 to the atmosphere and aligns port 180 in the rotary valve with port 182 in the seat so that communication between chamber 165 and pipe 104 is established.

It will be here understood that continuous movement from one to the next operating position of the rotary valve 164 will cause this valve to alternately establish the communication above described for a purpose fully described in the description of the operation.

OPERATION

*Charging of the locomotive equipment*

Assuming the main reservoir 1 is charged with fluid under pressure, the locomotive equipment will be charged as follows:

In charging the equipment the handle 23 of the automatic brake valve device 2 is placed in release position, in which position fluid under pressure from the main reservoir 1 is supplied directly to the brake pipe 6 through pipe 8, branch pipe 19, through the automatic brake valve device 2 and pipe 22. This produces a rapid increase in brake pipe pressure. After a certain interval of time has elapsed, the handle of the automatic brake valve device is turned from release to running position. Fluid under pressure is then supplied from the main reservoir 1 to the brake pipe 6 through pipe 8, connected pipe 20, feed valve 3, pipe 21, through the automatic brake valve device 2, and pipe 22, the feed valve device functioning in the usual manner to cut off the charging flow of fluid when the brake pipe pressure has been increased to that normally carried.

The handle 54 of the self-lapping brake valve device 4 will be in running position, in which position as hereinbefore pointed out, the control spring 62 will be compressed a predetermined degree. In initially charging the equipment the chamber 42 at one side of the diaphragm will be depleted of fluid under pressure, so that the spring 62 acts through the medium of the ball bearing spring seat 60, follower 46, diaphragm 37, follower stem 49, member 65 and exhaust valve 67 to maintain the supply valve 71 unseated against the opposing pressure of the spring 75. With the supply valve 71 unseated, communication is established from the main reservoir pipe 8 to the signal pipe 7, by way of pipe 31, restricted passage 73, chamber 72, past unseated valve 71, chamber 42, passage 43 and pipe 30.

With the above traced circuit established fluid under pressure flows from the main reservoir pipe 8 to the signal pipe 7 at a restricted rate and when the signal pipe 7 has been charged to the pressure which it is desired to normally carry, say for instance 45 pounds, fluid in the chamber 42, which is at signal pipe pressure causes the diaphragm 37 to flex upwardly against the opposing pressure of the control spring 62, the follower 61, and the member 65 being moved upwardly by the diaphragm. As the member 65 thus moves, the spring 75 acts to move the supply valve 71 to its seated position as shown in Fig. 6 of the drawings. It will here be noted that during the operation just described the exhaust valve 67 is maintained in its seated position, so that there can be no escape of fluid under pressure from the chamber 42 and consequently from the signal pipe 7 by way of the atmospheric passage 66.

*Charging of the car equipment*

Fluid under pressure supplied to the main reservoir pipe 8, signal pipe 7 and brake pipe 6 on the locomotive will flow to the corresponding pipes on each car throughout the train. From the main reservoir pipe 8 of the car, as shown in Fig. 1, fluid under pressure flows to the supply reservoir 16 by way of a pipe 130, from whence it flows to chamber 132 of the control valve device 15 by way of pipe 134.

Fluid under pressure is supplied from the signal pipe 7 to the trainman's signal controlling valve device 13 by way of pipe 87 and is also supplied to the signal valve device 5 by way of pipe 24, and thus charges the chambers contained therein to the pressure normally carried in the signal pipes.

Fluid under pressure supplied to the signal pipe 7 also flows through pipe 115 to the chamber 114 of the control valve device 15 to charge said chamber to signal pipe pressure. It will be noted that normal signal pipe pressure is slightly less than the opposing pressure of the spring 123 so that the several operating parts of the control valve device remain in the position in which they are shown in Fig. 2 of the drawings.

Fluid under pressure is supplied from the brake pipe 6 through branch pipe 80 to the triple valve device 9, and from the triple valve device fluid under pressure flows in the usual manner to the auxiliary reservoir 10. The triple valve device will of course be in its release position and in this position connects the brake cylinder control pipe 82 and thereby the pipe 93 to the atmosphere by way of the triple valve device 9, pipe 86 and brake cylinder pressure retaining valve device 14. With the check valve devices 17 and 18 positioned, as shown in Fig. 1 of the drawings, the brake cylinders 11 and 12 are connected to the pipe 93 and since, as just described, pipe 93 is connected to the atmosphere the brake cylinders 11 and 12 are also connected to the atmosphere and as a consequence the brakes controlled by both brake cylinders are maintained released.

*Automatic service application*

In order to effect an automatic service application of the brakes the automatic brake valve device 2 is moved to service position to effect, in the usual manner, a reduction in brake pipe pressure at a service rate. The triple valve device 9 on each car responds to the reduction in brake pipe pressure in a manner familiar to those skilled in the art to cut off communication between the brake cylinder control pipe 82 and the pipe 86 and at the same time establishes communication between the pipe 81 and the brake cylinder control pipe 82. With this latter communication established fluid under pressure flows from the auxiliary reservoir 10 to the brake cylinder control pipe 82 and connected pipe 93, from whence it flows past piston 90 of the check valve device 17 to the pipe 92 and connected brake cylinder 11 and at the same time past piston 100 of the check valve device 18 to the pipe 102 and connected brake cylinder 12, to initiate an application of the brakes controlled by both the brake cylinder 11 and the brake cylinder 12.

It should here be mentioned that in effecting an automatic service application of the brakes, the self-lapping brake valve device 4 will remain in its normal position.

*Release after a service application*

If it is desired to release the brakes on the train after an automatic service application of the brakes, the operating handle 23 of the automatic brake valve device 2 may be turned, first to release position where it is held momentarily to accelerate the charging of the brake pipe, and then to running position in which the charging of the brake pipe will continue at a slower rate until the equipment is fully charged. Inasmuch as the brake equipments on the cars and the locomotive operate in the usual manner to effect a release of the brakes on the cars and on the locomotive it is deemed unnecessary to describe the specific release operations of the equipment.

*Operation of the signal system*

If it is desired to signal the engineer from any car of the train, a trainman moves the handle 88 of one of the trainman's signal controlling valve devices 13 either to the right or to the left of its vertical or normal position of the drawing to open a communication from pipe 8 and thereby the signal pipe 7 to the atmosphere. With the pipe 87 thus connected to the atmosphere a reduced pressure wave is effected in the signal pipe 7 and connected pipe 24 leading to the signal valve device 5, which valve device responds, in the usual manner, to said reduced pressure wave to sound an audible signal in the cab of the locomotive, such signal being typified by the whistle 25. When a sufficient reduction in signal pipe pressure has been thus effected the valve device 13 is permitted to assume its normal position.

It should here be mentioned that with the handle of the valve device 13 returned to its normal position the signal pipe 7 is automatically recharged to the normal pressure carried therein by the self-lapping brake valve device, when the handle of the brake valve device is in running position.

The operation of the brake equipment and signal system thus far described is standard, except for operation of the self-lapping brake valve device 4, in its running position, to normally charge and maintain charged the signal pipe 7 and the signal valve device 5.

*Application of the brakes by variations in signal pipe pressure*

In accordance with the invention the brakes may be applied and released by varying signal pipe pressure between the normal pressure carried and a pressure higher than the normal pressure, an increase in the pressure above normal pressure acting to effect an application of the brakes and a reduction in this pressure toward the normal pressure acting to effect a release of the brakes. These variations in signal pipe pressure are effected through the manipulation of the self-lapping brake valve device 4 by the engineman.

Another feature of the invention resides in the provision of a control or selector valve device 15 which operates automatically in response to variations in the signal pipe pressure between the normal and higher than normal pressures to alternate the control of the brakes on the trucks of a vehicle so that the brakes on any one truck cannot be applied twice in succession. The invention is not intended to be limited to the alternate control of the complete truck brakes since it is obvious that it may be employed for controlling brakes which are complete for each wheel and axle assembly or for each wheel so that any set of brakes cannot be applied twice in succession.

While this control of the brake may be employed at any time that an automatic application of the brakes is not being effected, it is particularly useful in grade operations to eliminate the use of the automatic brake valve device for cycling the brakes after the initial application has been effected and to also eliminate the necessity of setting the brake cylinder pressure retaining valve devices to their pressure retaining positions, all of which will be apparent from the following more detailed description.

*Control of brakes on a descending grade*

In handling a train equipped with the usual brake equipment it is the general practice, preparatory to descending a long grade, to turn all or some of the usual brake cylinder pressure retaining valve devices, such as indicated by the numeral 14 in Fig. 1, to their pressure retaining position. In descending the grade the brakes are alternately applied and released by the use of the automatic brake valve device the equipment being recharged in releasing. This alternate applying and releasing of the brakes is commonly termed "cycling."

It will be seen from the foregoing description that with each vehicle of a train equipped with the invention, the brake cylinder pressure retaining valve devices may be omitted, however, if vehicles equipped with the invention are to be mixed in a train with vehicles not so equipped then the retaining valves are necessary on each vehicle of the train.

When it is desired to effect an application of the brakes in descending a long grade, the automatic brake valve device 2 is operated in the usual manner to effect an automatic application of the brakes on both trucks of the vehicle in the manner hereinbefore described. With the brakes applied on both trucks of the vehicle, the handle 54 of the self-lapping brake valve device 4 is moved from its normal release position into the application zone. Upon movement of the handle 54 into the application zone, the control member 49 responds through the medium of the gear segment 52 and pinion 53 to further compress the control spring 62, which spring acts through follower 46 and attached diaphragm and stem mechanism as before described to unseat the supply valve 71 against the opposing pressure of the spring 75. With the supply valve 71 thus unseated fluid under pressure is supplied from the main reservoir 8 to the signal pipe 7 through the circuit hereinbefore traced, in connection with the description in charging of the equipment until the pressure of fluid in the signal pipe and consequently in chamber 42 is increased above the normal pressure carried to a degree corresponding to the degree or extent of movement of the handle 54 into the service application zone.

Upon such an increase in the pressure of fluid in the signal pipe, the fluid in chamber 114 of the control valve device 15, which is at signal pipe pressure causes the diaphragm 113 to flex downwardly against the opposing action of the spring 123. The diaphragm as it is thus flexed in this direction, acts through the medium of the follower 118, follower stem 119 and piston assembly to first close the exhaust valve 129 and then acts through the medium of the valve 129 and stem 130 to maintain the supply valve 131 unseated against the opposing action of the spring 133. With the supply valve 131 unseated fluid under pressure in chamber 132 flows to chamber 122, from whence it flows to rotary valve chamber 165 by way of passage 142, chamber 137, passage 138, past ball check valve 139 and passage 140. From the passage 138 fluid under pressure also flows through passage 141 to the passage 140.

When the pressure of fluid supplied to chamber 137 and acting on one side of piston 136 has been increased to a degree sufficient to overcome the opposing pressure of the spring 147 at the opposite side of the piston, the piston is caused to move in a direction toward the left hand, from that viewed in Fig. 2 of the drawings, until it engages a shoulder 200 provided on the inner wall of the casing.

As the piston 136 and thereby the piston stem 150, member 155 and arm 160 are being thus moved, the rotary valve 164 will due to the engagement of the tooth 172 by the hooked end of the arm 160 be rotated in a clockwise direction through an arc of 90 degrees from the position in which it is shown in Figs. 2 and 3 of the drawings. With the rotary valve thus positioned pipe 94 is connected to the atmosphere and pipe 104 is connected to chamber 165 in a manner hereinbefore described. With this latter communication established fluid under pressure in chamber 165 flows to pipe 104 and thus to the inner seated area of the right hand end of the check valve piston 100. If the pressure acting on this area is not sufficient to move the piston valve, against the combined opposing pressure of fluid under pressure and spring 101 acting on the left hand side of the piston, to its left hand seated position the brake cylinder pressure in brake cylinder 12 will not be increased, but will be maintained. However, if the pressure of fluid in pipe 104 and acting on this area is high enough to overcome the opposing pressure, the piston valve 100 will be moved to its left hand position and fluid under pressure will flow from pipe 104 to pipe 102 and thus to the brake cylinder 12 and increase the brake cylinder pressure. Since the pipe 94 is connected to the atmosphere by way of port 184 in the rotary valve seat, cavity 178 in the rotary valve and exhaust port 181 in the seat, the combined forces of fluid under pressure in pipe 93 and spring 91 will maintain the piston valve 90 of the check valve 17 in the position in which it is shown in Fig. 1 of the drawings, thus maintaining pipe 92 connected to pipe 93 thereby maintaining the brake cylinder pressure in brake cylinder 11.

When the pressure in pipe 104 and in connected chamber 122 of the control valve device 15 and acting on the piston assembly 124 has been increased to a degree sufficient to balance the increased opposing signal pipe pressure acting on the diaphragm 113 the spring 123 acting through the medium of the follower 118, causes the diaphragm to flex upwardly. The upward movement of the follower and thereby the stem 119 and piston assembly 124 permits the spring 133 to seat the supply valve 131, thus cutting off further flow of fluid under pressure from chamber 132 to chamber 122. It will be noted that during the operation just described the exhaust valve 129 is maintained in its seated position, so that there can be no escape of fluid under pressure from the chamber 122.

Now, when it is desired to recharge the brake pipe and at the same time cool the braking surfaces of the brakes controlled by one of the brake cylinders, the handle 23 of the automatic brake valve device 2 is turned either to release or running position in which position, as before described, the triple valve device 9 operates to effect release of fluid under pressure from the brake cylinder control pipe 82 and connected pipe 93 and at the same time provides for the recharge of the auxiliary reservoir 10. With the pipe 93 connected to the atmosphere and check valve 17 positioned as shown in Fig. 1 of the drawings, fluid under pressure is released from brake cylinder 11 thereby effecting a release of the brakes effected by operation of this brake cylinder. At the same time, a reduction in the pressure of fluid in pipe 93 below the valve of the spring 101 in check valve 18 permits the pressure in pipe 104 and acting on the right hand end of the piston valve 100 to move said piston valve to its left hand position, in which communication between the brake cylinder 12 and the pipe 93 is closed and in which communication is established between pipes 104 and 102. With this communication between pipes 104 and 102 established fluid under pressure in pipe 104 flows to the brake cylinder 12 to maintain applied the brakes which are associated with this brake cylinder.

In order to prevent excessive heating of the wheels and of the braking elements such as the brake shoes the engineman by the use of the self-lapping brake valve device 4, may effect the release of the brakes which have been maintained applied and at the same time effect an application of the brakes which were previously released. By operating the handle 54 of the self-lapping brake valve device 4 between running or release position and a desired position in the application zone the engineman may cause the separate sets of brakes to be applied and released alternately, that is to say may cause first one set of brakes to operate and then the other in turns so that any one set will not be applied twice in succession the released set of brakes being maintained in released condition for an interval of time sufficient to permit the wheel and brake shoes to cool, all of which will be apparent from the following more detailed description.

As hereinbefore described the set of brakes associated with the brake cylinder 12 is in its brake applied position and the set associated with the brake cylinder 11 is in its release position. Now when the operator wishes to cool the set of brakes which is now in applied position, he moves the handle 54 of the self-lapping brake valve device 4 to running position causing the member 49 to rotate and move upwardly relative to the stem 47, the clearance between the member and pin 63 being provided to permit such movement.

As the member 49 is moving upwardly it permits the control spring 62 to expand and thereby permits the fluid at higher than normal signal pipe pressure present in chamber 42 to flex the diaphragm upwardly, the diaphragm, upon such movement shifting the follower 46, followers stem 47 and 48 and follower stem extension 65 in the same direction against the now reduced opposing pressure of the control spring 62. Since, with the supply valve 71 seated, the exhaust valve 67 cannot move upwardly with the stem extension 65, the valve seat carried by the extension is moved away from the valve 67 so that fluid under pressure is now vented from the signal pipe 7 to the atmosphere by way of pipe 30, chamber 42, past the unseated valve 67, passage 66, chamber 38, passage 40, and restricted passage 41, thus initiating a reduction in signal pipe pressure.

Fluid under pressure thus vented by way of passage 40 also flows to the chamber 39 and connected passage 45, which pressure acting on the under side of the ball 44 causes said ball to be moved upwardly to a position in which it may be viewed, through the window 44, by the operator as long as the reducing signal pipe pressure is higher than the normal pressure carried.

Now when the signal pipe pressure in chamber 42 has been reduced slightly below the opposing pressure of the spring 62, said spring acts to move the follower 46 and thereby the diaphragm 37 and stem extension 65 downwardly, the valve seat on the stem extension engaging the valve 67 to cut off the flow of fluid from the chamber 42 and consequently from the signal pipe to the atmosphere. With the exhaust flow of fluid from the chamber 42 and the signal pipe thus cut off, the downward flexing of the diaphragm ceases so that the supply valve 71 remains seated. Since the chamber 39 is open to the atmosphere, by way of passage 40 and restricted passage 41, and there is no longer a supply of fluid thereto the chamber will be soon vented and as a consequence the ball 44 returns by force of gravity to the position in which it is shown in Fig. 6 of the drawings where it will be out of sight of the operator. When the ball drops out of sight the operator will know, as will hereinafter be more fully described, that the control valve device 15 is in its normal release position and that if desired he may move the brake valve handle 54 of the self-lapping brake valve device 4 into the application zone to effect an application of the released brakes without danger of maintaining the other brakes applied.

Since, as hereinbefore described, the signal pipe is in communication with the chamber 114 of the control valve device 15 by way of pipe 115, the pressure in the chamber reduces with signal pipe pressure.

As the pressure of fluid in chamber 114 is reduced with signal pipe pressure, the opposing pressure present in chamber 122 and acting on the piston assembly 124 acts through the medium of the stem 119 together with the spring 123 to shift the diaphragm follower 118 upwardly against the now reduced opposing pressure in chamber 114, such movement of the follower 118 causing the diaphragm 113 to flex upwardly. Since, with the supply valve 131 seated the exhaust valve 129 cannot move upwardly with the piston assembly 124, the valve seat carried by the packing cup 125 is moved away from the valve 129 so that fluid under pressure is now vented from chamber 137 to the atmosphere, by way of passage 142, chamber 122, past unseated valve 129, passage 128, chamber 118 and an exhaust passage 201.

Now when the pressure of fluid in chamber 137 and acting on one side of the piston 136 is reduced slightly below the opposing pressure of spring 147 acting on the opposite side of the piston, said spring acts to move the piston and thereby the stem 150 and attached member 155 and arm 168 to the position shown in Fig. 2 of the drawings. Movement to this position causes the hooked end of the flexible arm 160 to ratchet out of engagement with one tooth 172 of the element 170 and into engagement with the next tooth.

Since the chamber 137 is open to the atmosphere past the unseated exhaust valve 129 fluid under pressure will be released from the brake cylinder 12 by way of pipe 102, past check valve 18, pipe 104, port 182 in the rotary valve seat, port 180 in the rotary valve 164, chamber 165, passage 140, restricted passage 141 by-passing the closed check valve 139 and passage 138 connected to chamber 137.

When the pressure in the signal pipe 7 has been reduced to the pressure normally carried therein the several parts of the control valve device 15 will be in their release position so that the flow of fluid from the brake cylinder 12 will continue by way of the restricted passage 141 which has such a small flow area that the release of the brakes will be very gradual or at a slow rate until the brake cylinder pressure has been reduced to a low degree, say for instance one to five pounds. If the engineman wishes to effect an application of the brakes which have been in release position up to this time he will watch the ball 44 associated with the self-lapping brake valve device 4 and as soon as the ball moves out of sight he knows that the several parts of the control valve device 15 are in their release position and that it is therefore safe to move the brake valve handle 54 from release or running position into the application zone to effect an application of the brakes will have remained in release position.

Now when the operator returns the handle 54 to the application zone the valve mechanism of the self-lapping brake valve device will operate in the manner hereinbefore described to increase the pressure in the signal pipe 7.

In response to the increase in signal pipe pressure the control valve device 15 will operate in the same manner as hereinbefore described to cut off the exhaust communication from the chambers 122 and 137 and open the supply communication to admit fluid under pressure to the chamber. In response to the pressure of fluid in chamber 137 the piston 136 operates the arm 160 to move the selector rotary valve 164 ninety degrees in a clockwise direction to another control position in which the port 183 in the rotary valve aligns with the port 184 in the seat, thus connecting pipe 74 with the chamber 165 and at the same time connecting pipe 104 to the exhaust port 181 in the seat by the cavity 178 in the rotary valve.

With the first mentioned connection established fluid under pressure in chamber 132 flows past the unseated supply valve 131 to the pipe 94 by way of chamber 122, passage 142, chamber 137, passage 138, past ball check valve 139, passage 140, chamber 165, port 183 in the rotary valve and port 184 in the rotary valve seat. The pressure of fluid in pipe 94 acting on the left hand side of piston valve 90 of the check valve 17 causes said piston to move toward the left hand against the opposing pressure of the spring 91. Thus fluid under pressure flows from pipe 94 to pipe 92 and connected brake cylinder 11 to effect an application of the brakes associated with the brake cylinder 11 which brakes where previously maintained in release position.

With the second mentioned connection established by cavity 178 in the rotary valve the exhaust flow of fluid under pressure from the brake cylinder 12 to the atmosphere is now by way of pipe 102, past check valve 18, pipe 104, port 182 in the rotary valve seat, cavity 178 in the rotary valve 164 and exhaust port 181 in the valve seat, thus continuing the reduction in brake cylinder pressure until the brakes are released.

When the pressure of fluid in the brake cylinder 12 has been reduced to aforementioned predetermined low value at which the brakes are released the spring 101 of the check valve 18 acting on one side of the piston valve 100 moves said valve to the position in which it is shown in Fig. 1 of the drawings. With the piston valve 100 thus positioned the pipe 102 is connected to the pipe 93 so that the final release of fluid under pressure from the brake cylinder 12 to the atmosphere is by way of pipe 102, past check valve 18, pipe 93, pipe 82, through the triple valve device 9, pipe 86 and through the brake cylinder pressure retaining valve device 14.

It will here be understood that if the operator acts promptly upon the indication by the ball 44, the rate of release of fluid under pressure from the brake cylinder 12 is so controlled by the flow restricted passage 141 and the exhaust port 181 in the control valve device 15 that where the brakes associated with the brake cylinder 11 are being applied any change in the rate of retardation of the train will be immaterial.

From the foregoing description of grade operation it will be understood that at intervals determined by the operator, handle 54 of the self-lapping brake valve device 4 may be manipulated by release or by running position a position in the application zone and that in response to such operation the control valve device 15 will function to first effect an application of one of the set of brakes and then the other set in turn so that any one set of brakes cannot be applied twice in succession.

It will also be noted the control valve device 15 is connected to the supply reservoir 16 which is charged with fluid under pressure at main reservoir pressure, so that, if desired, higher braking forces may be obtained by brake applications effected by the self-lapping brake valve device than by the automatic brake valve device.

Since higher braking forces may be obtained by brake applications effected by manipulation of the self-lapping brake valve device 4 than by manipulation of the automatic brake valve device 2, the operator may at any time after an automatic application has been effected by manipulation of the automatic brake valve device 2 increase the braking force in one of these sets of brake cylinders by effecting in application of the brakes by manipulating the self-lapping brake valve device 4.

During this alternate control of the truck brakes the automatic equipment will ordinarily be fully charged and if the operator should for any reason desire to effect an application of both truck brakes, he may make an automatic application by moving the handle 23 of the automatic brake valve device 2 to application position. Under these conditions if one set of brakes is already applied only the released set will operate however if the degree of application called for by the automatic brake valve device is greater than that called for by the self-lapping brake valve device 4, the applied set will also be operated to increase the braking force.

*Release of all brakes*

When during the alternate control of the truck brakes it is desired to effect a complete release of the brakes the handle 54 of the self-lapping brake valve device is returned to and maintained in running position. With the handle in this position the brake valve mechanism is operative in a manner hereinbefore described to reduce the pressure in the signal pipe 7 to that normally carried therein, which results in a corresponding reduction in the pressure fluid in connected chamber 114 of the control valve device 15. Upon such reduction in the pressure of fluid in chamber 114 the valve mechanism of the control valve device 15 is operative in a manner hereinbefore described to seat the supply valve 131 and unseat the exhaust valve 129. With the exhaust valve 129 unseated fluid under pressure is vented from the chamber 137 thereby permitting the spring 149 to return the piston to the position in which it is shown in Fig. 2 of the drawings, in a manner before described.

Movement of the piston 136 to this position causes the hooked end of the arm 160 to ratchet out of engagement with a tooth 172 of the element 170 and into engagement with the following tooth 172 provided on the element 170. Since the rotary valve 164 may when it is desired to effect a complete release of the brakes be positioned to establish communication between chamber 165 and pipe 94 and between pipe 104 and the atmosphere or to establish communication between chamber 165 and pipe 104 and pipe 94 and the atmosphere, as previously described, it will be assumed, for the purpose of illustration, that the rotary valve 164 is positioned as shown in Fig. 2 of the drawings.

With the rotary valve so positioned, fluid under pressure in brake cylinder 12 will be connected to the atmosphere to effect a release of the brakes, by way of pipe 102, past check valve 18, pipe 104, port 182 in the rotary valve seat, cavity 178 in the rotary valve and exhaust port 181 in the seat. The release of fluid under pressure from the brake cylinder 12 to the atmosphere will continue through the circuit just traced until the spring 101 acting on piston 100 of the check valve 18 acts to move said piston to the position in which it is shown in the drawings after which the final release of fluid from the brake cylinder 12 is by way of pipe 102 past check valve 18, pipe 93, pipe 82 through triple valve device 9, pipe 86 and retaining valve device 14.

The brake cylinder 11 on the other truck of the vehicle will at this time be maintained released since the supply valve 131 and the exhaust valve 129 of the control valve are maintained in the position shown in Fig. 2 of the drawings when the pressure in chamber 114 is maintained at normal signal pipe pressure, so that the supply of fluid under pressure from chamber 132 to chamber 122 is cut off and chamber 122 is connected to the atmosphere. With this latter connection established any fluid under pressure trapped in chamber 165 and connected pipe 94 is vented, by way of passage 140, restricted passage 141, passage 138, chamber 137 and port 142.

*Application of brakes by operation of the self-lapping brake valve device with the automatic brake valve device in a release position*

If desired an application of the brakes may be effected by the self-lapping brake valve device 4 at any time while the automatic brake valve device is maintained in release or running position.

When it is desired to effect such an application of the brakes the handle 54 of the self-lapping brake valve device 4 is moved into the service application zone to effect an increase in signal pipe pressure corresponding to the degree or extent of movement of the handle 54 into said zone, in a manner previously described.

Such an increase in signal pipe pressure will, as before described, cause the control valve device 15 to operate from the release position, in which it is shown in Fig. 2 of the drawings, to an application position in which position the rotary valve 164 will be conditioned, as previously hereinbefore described, to establish a communication between the rotary valve chamber 165 and pipe 104 and between pipe 94 and the atmosphere.

With the control valve device in application position and the rotary valve 165 positioned as above described fluid under pressure flows from the supply reservoir 16 to pipe 104, by way of pipe 134, chamber 132, past unseated supply valve 131, chamber 122, passage 142, chamber 137, passage 138, past ball check valve 139, passage 140, chamber 165, port 180 in the rotary valve and port 187 in the seat. Fluid under pressure supplied to pipe 104 flows to the right hand face of piston valve 100 in check valve 18, thereby overcoming the opposing force of spring 101 and establishing a communication between pipes 104 and 102. With this communication established fluid under pressure in pipe 104 flows past the check valve 18 to the brake cylinder 12 to effect an application of the brakes controlled by this brake cylinder.

Since the pipe 94 is connected to the atmosphere, the spring 91 in the check valve 17 will act to maintain this check valve in the position in which it is shown in Fig. 1 of the drawings. With the check valve thus positioned communication is established between pipes 92 and 93 so that the brake cylinder 11 is maintained vented by way of pipes 93, pipe 82, triple valve 9, pipe 86 and retaining valve device 14, thus effecting a release of the brakes controlled by the brake cylinder.

If during the braking period it is desired to cool the braking surfaces controlled by the brake cylinder 12, these brakes may be released and the brakes controlled by the brake cylinder 11 applied. If it is desired to cool the braking surfaces controlled by the brake cylinder 12, the handle 54 of the self-lapping brake valve device 4 is moved to running position. When the handle 54 is moved to running position, the member 49 is caused to move upwardly, thereby effecting a reduction in signal pipe pressure from the higher than normal pressure to the normal pressure carried therein, in a manner hereinbefore described. Upon a reduction in the pressure of fluid in the signal pipe 7 to the normal pressure carried, a corresponding reduction results in the chamber 114 of the control valve device 15, and as previously described, the valve mechanism of the control valve device functions to release fluid under pressure from the pipe 104. When the pressure of fluid in pipe 104 has been reduced to aforementioned predetermined low value the spring 101 in the check valve 18 causes the piston valve 100 to move from the position shown in Fig. 1 of the drawings to a position in which pipe 102 is connected to pipe 93, so that the final release of fluid under pressure from the brake cylinder 12 is by way of pipe 102, past check valve 18, pipe 93, pipe 82, triple valve device 9, pipe 86 and retaining valve device 14.

Now the handle 54 of the self-lapping brake valve device is moved from its running position into the service application zone thus again increasing the pressure of fluid in the signal pipe 7 to a value above the pressure normally carried therein, in the manner already described, thus causing the control valve device 15 to function to effect an application of the brakes controlled by the brake cylinder 11 and to effect a release of the brakes controlled by the brake cylinder 12 in the same manner as described in connection with control of brakes on a descending grade.

From the foregoing it will be apparent that the operator may at intervals during the application apply the brakes controlled by one of the brake cylinders and release the brake controlled by the other, at any time so long as the automatic brake valve device 2 is maintained in release or running position. This permits a cooling period for the braking surfaces of the brakes released while the applied brakes tend to bring the train to a stop.

When the vehicle or train is brought to a stop or slowed down to the desired degree a complete release of the brakes is effected in the manner hereinbefore described under complete release of the brakes.

Having now described my invention, what I claim as new and desire to secure by Letters Patent, is:

1. In a brake system a plurality of motors each operating a separate brake, selector means operative automatically to cause the motors to operate alternately to control the brakes, and a controller device operative to effect the operation of said selector means.

2. In a brake system, two motors each operating a separate brake, selector means operative automatically to cause first one and then the other of said motors to operate by turns to apply and release their respective brakes, and a controller device operative to effect the operation of said selector means.

3. In a fluid pressure brake system of the type having signal apparatus comprising a signal pipe normally charged with fluid under pressure to a predetermined degree, in combination, means operative upon variations in the pressure of fluid in said signal pipe above said predetermined degree for effecting an application and a release of the brakes, and means operative for varying the pressure in said signal pipe above said predetermined degree.

4. In a fluid pressure brake system of the type having signal apparatus comprising a signal pipe normally charged with fluid under pressure to a predetermined degree, in combination, means responsive to variations in signal pipe pressure above said predetermined degree for effecting an application and a release of the brakes, and manually operative means for effecting variations in signal pipe pressure above said predetermined degree.

5. In a fluid pressure brake system of the type having signal apparatus comprising a signal pipe normally charged with fluid under pressure to a predetermined degree, in combination, self-lapping valve means responsive to variations in signal pipe pressure above said predetermined degree for effecting an application and a release of the brakes, and means for effecting variations in signal pipe pressure above said predetermined degree.

6. In a fluid brake system, two brake cylinders, each operating a separate brake, valve means operative by fluid under pressure supplied thereto to admit fluid under pressure to one of said brake cylinders, and operative upon the release of the actuating fluid therefrom to effect the release of fluid under pressure from the brake cylinder, and being operative in response to a subsequent supply of fluid under pressure thereto to admit fluid under pressure to the other of said brake cylinders, and a brake valve device operative to effect the supply of fluid under pressure to and the release of fluid under pressure from said valve means.

7. In a fluid pressure brake system, two brake cylinders, each operating a separate brake, a brake valve device having a brake release position and a brake application position and being operative between these positions in successive cycles to initiate an application and the release of the brakes, a control valve device operative for supplying fluid under pressure to and for releasing fluid under pressure from one and then the other of said brake cylinders by turns, said control valve device being responsive to the successive cycles of said brake valve device.

8. In a fluid pressure brake system of the type having signal apparatus comprising a signal pipe normally charged with fluid under pressure to a predetermined degree, in combination, means responsive to variations in signal pipe pressure above said predetermined degree for effecting an application and a release of the brakes, and a self-lapping brake valve for effecting variations in signal pipe pressure above said predetermined degree.

9. In a fluid pressure brake system of the type having signal apparatus comprising a signal pipe normally charged with fluid under pressure to a predetermined degree, a first brake cylinder control pipe, a second brake cylinder control pipe, means adapted to be conditioned to at one time supply fluid under pressure to said first brake cylinder control pipe to effect an application of one of a plurality of sets of brakes and at the same time release fluid under pressure from said second brake cylinder control pipe, to effect a release of another of said sets of brakes, means responsive to an increase in signal pipe pressure above said predetermined degree for conditioning said first mentioned means, and means for effecting an increase in the pressure of fluid in said signal pipe above said predetermined degree.

10. In a fluid pressure brake system of the type having signal apparatus comprising a signal pipe normally charged with fluid under pressure to a predetermined degree, a first brake cylinder control pipe, a second brake cylinder control pipe, means operative at one time to supply fluid under pressure to said first brake cylinder control pipe to effect an application of one of a plurality of sets of brakes, and to release fluid under pressure from said second brake cylinder control pipe to effect a release of another of said sets of brakes, said means being operative at another time to supply fluid under pressure to said second brake cylinder control pipe and to release fluid under pressure from said first brake cylinder control pipe to effect the application and release means responsive to variations in signal pipe pressure above said predetermined pressure for actuating said first mentioned means from one to the other of said position, and means for varying the pressure in said signal pipe above said predetermined pressure.

11. In a fluid pressure brake system of the type having signal apparatus comprising a signal pipe normally charged with fluid under pressure to a predetermined degree, one brake cylinder control pipe, another brake cylinder control pipe, means having one position for supplying fluid under pressure to said one brake cylinder control pipe to effect an application of one of a plurality of sets of brakes and for releasing fluid under pressure from said other brake cylinder control pipe to effect a release of another of said sets of brakes, said means having another position for supplying fluid under pressure to said other brake cylinder control pipe and for releasing fluid under pressure from said one brake cylinder control pipe reverse the operation of the sets of brakes, fluid under pressure operated means for actuating the first mentioned means successively from one to the other of said positions, and means responsive to an increase in signal pipe pressure above said predetermined pressure for effecting operation of said fluid pressure operated means to actuate said first mentioned means from one to the other of said positions.

12. In a fluid pressure brake system of the type having a signal apparatus comprising a signal pipe normally charged with fluid under pressure to a predetermined degree, one brake cylinder control pipe, another brake cylinder control pipe, means having one position for supplying fluid under pressure to said one brake cylinder control pipe to effect an application of one of a plurality of sets of brakes and for releasing fluid under pressure from said other brake cylinder control pipe to effect a release of another of said sets of brakes, said means having another position for supplying fluid under pressure to said other brake cylinder control pipe and for releasing fluid under pressure from said one brake cylinder control pipe reverse the operation of the sets of brakes, fluid pressure responsive means operative for actuating said means from one to the other of said positions and operative upon the release of fluid under pressure therefrom for conditioning said means to reverse its position upon a subsequent increase in fluid under pressure acting thereon valve means for controlling the supply of fluid under pressure to and the release of fluid under pressure from said fluid pressure responsive means, and means responsive to variations in signal pipe pressure above said predetermined degree for actuating said valve means.

13. In a fluid pressure brake system of the type having a signal apparatus comprising a signal pipe normally charged with fluid under pressure to a predetermined degree, one brake cylinder control pipe, another brake cylinder control pipe, means having one position for supplying fluid under pressure to said one brake cylinder control pipe to effect an application of one of a plurality of sets of brakes and for releasing fluid under pressure from said other brake cylinder control pipe to effect a release of another of said sets of brakes, said means having another position for supplying fluid under pressure to said other brake cylinder control pipe and for releasing fluid under pressure from said one brake cylinder control pipe reverse the operation of the sets of brakes, fluid pressure responsive means operative for actuating said means from one to the other of said positions and operative upon the release of fluid under pressure therefrom for conditioning said means to reverse its position upon a subsequent increase in fluid under pressure acting thereon valve means for controlling the supply of fluid under pressure to and the release of fluid under pressure from said fluid pressure responsive means, and means responsive to variations in signal pipe pressure above said predetermined degree for actuating said valve means, the last mentioned means comprising a movable abutment normally subject on one side to fluid under pressure at signal pipe pressure and on the opposite side to the pressure of a spring.

14. In a fluid pressure brake system of the type having signal apparatus comprising a signal pipe normally charged with fluid under pressure to a predetermined degree, a first brake cylinder pipe through which fluid under pressure is adapted to be supplied and released to effect an application and a release of the brakes, a second brake cylinder control pipe through which fluid under pressure is adapted to be supplied and released to effect an application and a release of brakes, a chamber, a rotary valve disposed in said chamber, said rotary valve being operative to successively establish at one time communication between said first brake cylinder control pipe and said chamber and said second brake cylinder control pipe and the atmosphere and at another time communication between said second brake cylinder control pipe and said chamber and said first brake cylinder control pipe and the atmosphere, a fluid pressure operated ratchet mechanism operative upon a supply of fluid under pressure thereto for actuating said rotary valve successively from one to the other of said positions, valve means for supplying fluid under pressure to and releasing fluid under pressure from said chamber and to said ratchet mechanism, means responsive to an increase in signal pipe pressure above said predetermined degree for controlling said valve means, and a self-lapping brake valve device for normally maintaining said signal pipe pressure to said predetermined degree and operative to increase or decrease the pressure of fluid in said pipe above said predetermined degree.

15. In a fluid pressure brake equipment comprising a fluid pressure supply source, a signal pipe normally charged with fluid from said source to a predetermined pressure, means operative in response to an increase in signal pipe pressure above said predetermined pressure for effecting an application of the brakes, and a valve device normally controlling the supply of fluid under pressure from said source to the signal pipe and to maintain the signal pipe fluid at said predetermined pressure and being operative to supply additional fluid under pressure from said source to increase the signal pipe pressure above the normal pressure carried.

16. In a fluid pressure brake equipment comprising a fluid pressure supply source, a signal pipe normally charged with fluid from said source to a predetermined pressure, means operative in response to an increase in signal pipe pressure above said predetermined pressure for effecting an application of the brakes and a valve device operative automatically to supply fluid under pressure from the fluid pressure supply source to the signal pipe and to cut off the supply when the normal signal pipe pressure has been attained said valve device being operative manually for admitting additional fluid under pressure to the signal pipe to increase signal pipe pressure above said predetermined pressure.

17. The combination with a train signal pipe normally charged with fluid under pressure and a source of fluid under pressure, of a valve device normally operative automatically to limit the pressure to which the signal pipe is normally charged, means operative upon an increase in signal pipe pressure above the normal pressure for effecting an application of the brakes, and means included in said valve device operative manually for increasing the pressure of fluid in the signal pipe above the normal pressure carried.

18. In a fluid pressure brake system of the type having signal apparatus comprising a signal pipe normally charged with fluid under pressure to a predetermined degree, in combination, a brake valve device normally operative to maintain said signal pipe charged with fluid under pressure to said predetermined degree and operative to vary the pressure of fluid in said signal pipe above said predetermined degree, and means operative upon variations in signal pipe pressure above said predetermined degree for effecting an application of the brakes in proportion to the increase in signal pipe pressure.

19. In a fluid pressure brake system of the type having signal apparatus comprising a signal pipe normally charged with fluid under pressure to a predetermined degree, in combination, a brake valve device normally operative to maintain said signal pipe charged with fluid under pressure to said predetermined degree and operative to vary the pressure of fluid in said signal pipe above said predetermined degree, a brake cylinder responsive to fluid under pressure supplied thereto for applying the brakes, a source of fluid under pressure, and means operative upon an increase in pressure in said signal pipe above said predetermined degree for supplying fluid under pressure from said source to said brake cylinder and operative for cutting off the supply of fluid under pressure from said source to said brake cylinder upon an increase in fluid pressure in said brake cylinder to a degree proportionate to said increase in signal pipe pressure.

20. In a fluid pressure brake system of the type having signal apparatus comprising a signal pipe normally charged with fluid under pressure to a predetermined degree, in combination, means operative upon variations in the pressure of fluid in said signal pipe above said predetermined degree for effecting an application and a release of the brakes, and a brake valve device having a running position and an application and release zone, said brake valve device being operative in said running position to maintain the pressure in said signal pipe at said predetermined degree and operative in said application and release zone to vary the pressure in said signal pipe above said predetermined degree.

21. In a fluid pressure brake system of the type having signal apparatus comprising a signal pipe normally charged with fluid under pressure to a predetermined degree, in combination, means operative upon variations in the pressure of fluid in said signal pipe above said predetermined degree for effecting an application and a release of the brakes, a brake valve device having a running position and an application and release zone, said brake valve device being operative in said running position to maintain the pressure in said signal pipe at said predetermined degree and operative in said application and release zone to vary the pressure in said signal pipe above said predetermined degree and means associated with said brake valve device operative upon operations of the brake valve device from the application and release zone to running position for indicating when said pressure has been reduced to said predetermined normal degree.

22. In a fluid pressure brake system having at least two fluid pressure responsive means both operative in response to fluid under pressure supplied thereto for applying the brakes and operative in response to fluid under pressure vented therefrom for releasing the brakes, a control pipe normally charged with fluid under pressure, means for supplying fluid under pressure to and for venting fluid under pressure from the fluid pressure responsive means, said means comprising valve means operative at one time upon variations in pressure in the control pipe to control the pressure of fluid in one fluid pressure responsive means and to vent fluid under pressure from the other, and operative at another time upon variations in the pressure in the control pipe to control the pressure of fluid in said other fluid pressure responsive means and vent said one fluid pressure responsive means.

23. In a fluid pressure brake system having at least two fluid pressure responsive means both operative in response to fluid under pressure supplied thereto for applying the brakes and operative in response to fluid under pressure vented therefrom for releasing the brakes, a control pipe normally charged with fluid under pressure, means for supplying fluid under pressure to and for venting fluid under pressure from the fluid pressure responsive means, said means comprising valve means operative at one time upon variations in pressure on the control pipe to control the pressure of fluid in one fluid pressure responsive means and to vent fluid under pressure from the other, and operative at another time upon variations in the pressure in the control pipe to control the pressure of fluid in said other fluid pressure responsive means and vent said one fluid pressure responsive means, and means for varying the pressure in the control pipe.

24. In a fluid pressure brake system having at least two fluid pressure responsive means both operative in response to fluid under pressure supplied thereto for applying the brakes and operative in response to the venting of fluid under pressure therefrom for releasing the brakes, a control pipe normally charged with fluid under pressure, valve means for opening a fluid pressure supply communication to one of said fluid pressure responsive means and for at the same time opening a venting communication to the other fluid pressure responsive means, the valve means being operative at one time upon variation in pressure in the control pipe to open the fluid pressure supply communication to said one fluid pressure responsive means and to open the venting communication to said other fluid pressure responsive means, and operative at another time upon variation in control pipe pressure to open the fluid pressure supply communication to said other fluid pressure responsive means and to open the venting communication to said one fluid pressure responsive means, and a self-lapping brake valve device for varying the pressure in said control pipe.

25. In a fluid pressure brake system having a plurality of brake cylinder devices operative in response to fluid under pressure supplied thereto for applying the brakes and operative in response to the venting of fluid under pressure therefrom for releasing the brakes, a control pipe normally charged with fluid under pressure, valve means for opening a fluid pressure suply communication to one of said brake cylinders and at the same time opening a venting communication to other brake cylinder device, and means responsive to the pressure of fluid supplied at one time to the control pipe to open the fluid pressure supply communication to one brake cylinder and to open the venting communication to another of the brake cylinders, said means being responsive to the pressure of fluid supplied at another time to the control pipe to open the fluid pressure supply communication to said other brake cylinder and to open the venting communication to said one brake cylinder device, and manually operated means for varying the pressure in the control pipe.

26. In a fluid pressure brake system having two brake cylinder devices operative in response to variations in fluid under pressure supplied thereto for applying the brakes and operative in response to the venting of fluid under pressure therefrom for releasing of the brakes, a control pipe normally charged with fluid under pressure, valve means for alternately supplying fluid under pressure to one of said brake cylinder devices and venting fluid under pressure from the other and for supplying fluid under pressure to the other and venting fluid under pressure from the first, fluid pressure responsive means subject to control pipe pressure for causing operation of said valve means, said fluid pressure responsive means being operative at one time upon an increase in control pipe pressure to supply fluid under pressure to one of said brake cylinder devices and to vent fluid under pressure from the other, and operative at another time upon an increase in control pipe pressure to reverse the supply and release of fluid under pressure to and from said brake cylinder devices, and means for varying the pressure in the control pipe.

27. In a fluid pressure brake system having two brake cylinder devices operative in response to variations in fluid under pressure supplied thereto for applying the brakes and operative in response to the venting of fluid under pressure therefrom for releasing of the brakes, a control pipe normally charged with fluid under pressure, valve means for alternately supplying fluid under pressure to one of said brake cylinder devices and venting fluid under pressure from the other and for supplying fluid under pressure to the other and venting fluid under pressure from the first, a ratchet mechanism for actuating the valve means, and means operative at one time upon an increase in the control pipe pressure to cause said ratchet mechanism to actuate said valve means to supply fluid under pressure from the other brake cylinder, and operative at another time upon an increase in control pipe pressure to cause said ratchet mechanism to actuate said valve means to supply fluid under pressure to said other brake cylinder and to vent fluid under pressure from said one brake cylinder and a brake valve device for varying the pressure in the control pipe.

28. In a fluid pressure brake system having two brake cylinder devices operative in response to variations in fluid under pressure supplied thereto for applying the brakes and operative in response to the venting of fluid under pressure therefrom for releasing of the brakes, a control pipe normally charged with fluid under pressure, a rotary valve for alternately supplying fluid under pressure to one of said brake cylinder devices and venting fluid under pressure from the other and for supplying fluid under pressure to said other brake cylinder device and venting fluid under pressure from one brake cylinder device, a fluid pressure operated ratchet mechanism for controlling the operation of said rotary valve, movable abutment means operative at one time upon an increase in control pipe pressure for effecting operation of said fluid pressure operated ratchet mechanism to cause said rotary valve to supply fluid under pressure to said one brake cylinder device and to vent fluid under pressure from said other brake cylinder device operative at another time upon an increase in control pipe pressure for effecting operation of said fluid pressure operated ratchet mechanism to cause said rotary valve to supply fluid under pressure to said other brake cylinder device and to vent fluid under pressure from said one brake cylinder device and a self-lapping brake valve device operative to vary the pressure of fluid in the control pipe.

29. In a fluid pressure brake system having at least two brake cylinders operative in response to fluid under pressure supplied thereto for applying the brakes and operative in response to the venting of fluid under pressure therefrom for releasing the brakes, a control pipe normally charged with fluid under pressure to a predetermined degree, means operative upon a reduction in the pressure of fluid in said control pipe below said predetermined degree to produce an action other than braking, valve means for opening a communication through which fluid under pressure is supplied to one of said brake cylinders and for also opening a communication through which the other brake cylinder is vented, fluid pressure responsive means for controlling the operation of said valve means, said fluid pressure responsive means being operative at one time upon an increase in control pipe pressure above said predetermined degree to cause said valve means to open the fluid pressure supply communication to said one brake cylinder and to open the venting communication to said other brake cylinder, and operative at another time upon an increase in pressure in the control pipe above said predetermined degree to open the fluid pressure supply communication to said other brake cylinder and to open the venting communication to the said one brake cylinder, and means for varying the pressure in the control pipe.

30. In a fluid pressure brake system having at least two fluid responsive means both operative in response to fluid under pressure supplied thereto for applying the brakes and operative in the release of fluid under pressure therefrom for releasing the brakes, a fluid pressure equipment comprising a brake pipe normally charged with fluid under pressure and including a valve device operative upon variations in brake pipe pressure for supplying fluid under pressure to and releasing fluid under pressure from both of said fluid pressure responsive means, another fluid pressure equipment comprising a signal pipe normally charged with fluid under pressure to a predetermined degree and including a device operative upon variations in signal pipe pressure above said predetermined degree for supplying fluid under pressure to one of the fluid pressure responsive means and releasing fluid under pressure from the other of said fluid pressure responsive means, and means comprising a valve operative by fluid under pressure supplied by said device for at one time establishing communication through which fluid under pressure is supplied by said device to said one fluid pressure responsive means and for at another time isolating this fluid pressure responsive means from said valve device and comprising a valve for establishing communication between said other fluid pressure responsive means and said valve device and for isolating the device from said other fluid pressure responsive means.

31. In a fluid pressure brake system having at least two fluid responsive means both operative in response to fluid under pressure supplied thereto for applying the brakes and operative in the response to the release of fluid under pressure therefrom for releasing the brakes, a fluid pressure equipment comprising a brake pipe normally charged with fluid under pressure and including a valve device operative upon variations in brake pipe pressure for supplying fluid under pressure to and releasing fluid under pressure from both of said fluid pressure responsive means, another fluid pressure equipment comprising a signal pipe normally charged with fluid under pressure to a predetermined degree and including a device operative upon variations in signal pipe pressure above said predetermined degree for supplying fluid under pressure to one of the fluid pressure responsive means and releasing fluid under pressure from the other of said fluid pressure responsive means, a check valve device operative by fluid under pressure supplied by said device for establishing communication through which fluid under pressure is supplied by said device to only one of said fluid pressure responsive means and for isolating said one fluid pressure responsive means from said valve device, and another check valve device for establishing communication between the other fluid pressure responsive means and valve device and for isolating the device from said other fluid pressure responsive means.

32. In a fluid pressure brake system of the type having a signal apparatus, in combination, a brake cylinder pipe through which fluid under pressure is supplied to effect an application of the brakes, a first control pipe through which fluid under pressure is supplied to said brake cylinder pipe, a second control pipe through which fluid under pressure is supplied to said brake cylinder pipe, a brake pipe normally charged with fluid under pressure to a predetermined degree, a signal pipe normally charged with fluid under pressure to a predetermined degree, a first control valve device operative upon a reduction in brake pipe pressure below said predetermined degree for supplying fluid under pressure to said first control pipe, a second control valve device operative upon an increase in the pressure of fluid in said signal pipe above said predetermined degree for supplying fluid under pressure to said second control pipe, and valve means operative by the pressure of fluid in said first control pipe for connecting said first control pipe to said brake cylinder pipe and for isolating said second control pipe from said brake cylinder pipe.

33. In a fluid pressure brake system of the type having a signal apparatus, in combination, a brake cylinder pipe through which fluid under pressure is supplied to effect an application of the brakes, a first control pipe through which fluid under pressure is supplied to said brake cylinder pipe, a second control pipe through which fluid under pressure is supplied to said brake cylinder pipe, a brake pipe normally charged with fluid under pressure to a predetermined degree, a signal pipe normally charged with fluid under pressure to a predetermined degree, a first control valve device operative upon a reduction in brake pipe pressure below said predetermined degree for supplying fluid under pressure to said first control pipe, a second control valve device operative upon an increase in the pressure of fluid in said signal pipe above said predetermined degree for supplying fluid under pressure to said second control pipe and a check valve device operative by the pressure of fluid in said second control pipe for connecting said second control pipe to said brake cylinder pipe and for isolating said first control pipe from said brake cylinder pipe.

34. In a fluid pressure brake system of the type having a signal apparatus including a signal pipe normally charged with fluid under pressure to a predetermined degree, in combination, a first brake cylinder, a second brake cylinder, a first brake cylinder pipe through which fluid under pressure is supplied to and released from said first brake cylinder to effect an application and a release of one of a plurality of sets of brakes, a second brake cylinder pipe through which fluid under pressure is supplied to and released from said second brake cylinder to effect an application and a release of another of said sets of brakes, a first control pipe through which fluid under pressure is supplied to and released from said first brake cylinder pipe, a second control pipe through which fluid under pressure is supplied to and released from said second brake cylinder pipe, a third control pipe through which fluid under pressure is supplied to and released from both said first and said second brake cylinder pipes, a brake pipe normally charged with fluid under pressure to a predetermined degree, a first control means operative when the pressure of fluid in said brake pipe is maintained at said normal degree for releasing fluid under pressure from said third pipe and operative upon a reduction in pressure below said predetermined degree for supplying fluid under pressure to said third pipe, a second control means operative when the pressure of fluid in said signal pipe is maintained at said predetermined degree for releasing fluid under pressure from both said first and said second control pipes and operative upon an increase in the pressure of fluid above said predetermined degree for at one time supplying fluid under pressure to said first control pipe and releasing fluid under pressure from said second control pipe, a check valve device operative by the pressure of fluid in said first control pipe for connecting said first control pipe to said first brake cylinder pipe and for isolating said third control pipe from said first brake cylinder pipe, and a check valve device for connecting said second brake cylinder pipe to said third control pipe and for isolating said second control pipe from said second brake cylinder pipe.

35. In a fluid pressure brake equipment of the type having a signal system comprising a signal pipe normally charged with fluid under pressure to a predetermined degree, in combination, a first brake cylinder, a second brake cylinder, a first brake cylinder pipe, a second brake cylinder pipe, a first control pipe, a second control pipe, a third control pipe, a first check valve device normally operative for connecting said third control pipe to said first brake cylinder pipe and for isolating said first control pipe from said first brake cylinder pipe and being operative by the pressure of fluid in said first control pipe for connecting said first control pipe to said first brake cylinder pipe and for isolating said third control pipe from said first brake cylinder pipe, a second check valve device normally operative for connecting said third control pipe to said second brake cylinder pipe and for isolating said second control pipe from said second brake cylinder pipe and being operative by the pressure of fluid in said second control pipe for connecting said second control pipe to said second brake cylinder pipe and for isolating said third control pipe from said second brake cylinder pipe, a brake pipe normally charged with fluid under pressure to a predetermined degree, means responsive to variations in brake pipe pressure normally operative to vent fluid under pressure from said third control pipe and operative upon reductions in brake pipe pressure below said predetermined degree for supplying fluid under pressure to said third control pipe and thereby to said first and said second brake cylinder pipes for causing both the first and said second brake cylinders to effect an application of the brakes, and means responsive to variations in signal pipe pressure normally operative to vent fluid under pressure from both said first and said second control pipes and operative upon an increase in signal pipe pressure above said predetermined degree for at one time supplying fluid under pressure to said first control pipe to effect operation of said first check valve for supplying fluid under pressure to said first brake cylinder pipe for causing only said first brake cylinder to effect an application of the brakes.

36. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and opeative upon an increase in brake pipe pressure for releasing fluid under pressure from both brake cylinders, a brake valve device operative to an application position for venting fluid under pressure from the brake pipe and operative to a release position for increasing brake pipe pressure, means conditionable while said brake valve device is in application position for operation, when the brake valve device is moved to a release position, to effect the release of fluid under pressure from one of said brake cylinders, and manually operative means for conditioning the conditionable means.

37. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and operative upon an increase in brake pipe pressure for releasing fluid under pressure from both brake cylinders, a brake valve device operative to an application position for venting fluid under pressure from the brake pipe and operative to a release position for increasing brake pipe pressure, a main reservoir means conditionable while said brake valve device is in application position for operation, when the brake valve device is moved to a release position, to effect the release of fluid under pressure from one of said brake cylinders and to establish a fluid pressure supply communication from said main reservoir to the other of said brake cylinders and means manually operative for conditioning the conditionable means.

38. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and operative upon an increase in brake pipe pressure for releasing fluid under pressure from both brake cylinders, a brake valve device operative to an application position for venting fluid under pressure from the brake pipe and operative to a release position for increasing brake pipe pressure, a main reservoir, a signal pipe, a second brake valve device normally operative to supply fluid under pressure from the main reservoir to said signal pipe to charge the signal pipe to a certain normal pressure and to normally maintain the fluid in the signal pipe at said normal pressure, said second brake valve device being manually operative to supply fluid under pressure from the main reservoir to the signal pipe to increase the signal pipe pressure above said normal pressure, and means conditionable, while said brake valve device is in application position, for operation, when signal pipe pressure is increased above said normal pressure to effect the release of fluid under pressure from one of said brake cylinders.

39. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and operative upon an increase in brake pipe pressure for releasing fluid under pressure from both brake cylinders, a brake valve device operative to an application position for venting fluid under pressure from the brake pipe and operative to a release position for increasing brake pipe pressure, a main reservoir, a signal pipe, a second brake valve device normally operative to supply fluid under pressure from the main reservoir to said signal pipe to charge the signal pipe to a certain normal pressure and to normally maintain the fluid in the signal pipe at said normal pressure, said second brake valve device being manually operative to supply fluid under pressure from the main reservoir to the signal pipe to increase the signal pipe pressure above said normal pressure, and a combined selector and relay valve device conditionable while said brake valve device is in application position, for operation when signal pipe pressure is increased above said normal pressure, to effect the release of fluid under pressure from one of said brake cylinders.

40. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and operative upon an increase in brake pipe pressure for releasing fluid under pressure from both brake cylinders, a brake valve device operative to an application position for venting fluid under pressure from the brake pipe and operative to a release position for increasing brake pipe pressure, a main reservoir, a signal pipe, a second brake valve device normally operative to supply fluid under pressure from the main reservoir to said signal pipe to charge the signal pipe to a certain normal pressure and to normally maintain the fluid in the signal pipe at said normal pressure, said second brake valve device being manually operative to supply fluid under pressure from the main reservoir to the signal pipe to increase the signal pipe pressure above said normal pressure, and a combined selector and relay valve device conditionable while said brake valve device is in application position, for operation, when signal pipe pressure is increased above said normal pressure, to effect the release of fluid under pressure from one of said brake cylinders, said means comprising a selector valve for effecting the release of fluid under pressure from said one brake cylinder and a fluid pressure responsive mechanism for actuating said selector valve.

41. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and operative upon an increase in brake pipe pressure for releasing fluid under pressure from both brake cylinders, a brake valve device operative to an application position for venting fluid under pressure from the brake pipe and operative to a release position for increasing brake pipe pressure, a rotary valve conditionable, while said brake valve device is in application position, for operation, when the brake valve device is moved to a release position, to effect the release of fluid under pressure from one of said brake cylinders, fluid pressure responsive means for conditioning the rotary valve, and manually operative means for effecting operation of the fluid pressure responsive means.

42. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and operative upon an increase in brake pipe pressure for releasing fluid under pressure from both brake cylinders, a brake valve device operative to an application position for venting fluid under pressure from the brake pipe and operative to a release position for increasing brake pipe pressure, a selector valve conditionable, while said brake valve device is in application position, for operation, when the brake valve device is moved to a release position, to effect the release of fluid under pressure from one of said brake cylinders, fluid pressure responsive means for conditioning the rotary valve, valve means for controlling said fluid pressure responsive means and manually operative means for effecting operation of the valve means.

43. In a fluid pressure brake system, an auxiliary reservoir, a brake pipe, two brake cylinders each operative by fluid under pressure to operate a separate set of brakes, means operative upon a predetermined reduction in brake pipe to supply fluid under pressure from the auxiliary reservoir to both brake cylinders to effect an application of both sets of brakes to a certain degree and operative upon an increase in brake pipe pressure for releasing fluid under pressure from both brake cylinders to effect the release of both sets of brakes, an automatic brake valve device operative to an application position for venting fluid under pressure from the brake pipe and operative to a release position for increasing brake pipe pressure, means conditionable, while said brake valve device is in application position, for operation, when the brake valve device is moved to a release position, to effect the release of fluid under pressure from one of said brake cylinders to effect a release of one set of brakes and to effect a supply of fluid under pressure to the other brake cylinder to increase the application above said certain degree, and manually operative means for conditioning the conditionable means.

44. In a fluid pressure brake system, an auxiliary reservoir, a brake pipe, two brake cylinders each operative by fluid under pressure to operate a separate set of brakes, means operative upon a predetermined reduction in brake pipe to supply fluid under pressure from the auxiliary reservoir to both brake cylinders to effect an application of both sets of brakes to a certain degree and operative upon an increase in brake pipe pressure for releasing fluid under pressure from both brake cylinders to effect the release of both sets of brakes, an automatic brake valve device operative to an application position for venting fluid under pressure from the brake pipe and operative to a release position for increasing brake pipe pressure, a main reservoir, means conditionable, while said brake valve device is in application position, for operation, when the brake valve device is moved to a release position, to effect the release of fluid under pressure from one of said brake cylinders to effect a release of one set of brakes and to supply fluid under pressure from the main reservoir to the other brake cylinder to increase the degree of application in said other brake cylinder above said certain degree, and a second brake valve device operative for conditioning the conditionable means.

45. In a fluid pressure brake system, an auxiliary reservoir, a brake pipe, two brake cylinders each operative by fluid under pressure to operate a separate set of brakes, means operative upon a predetermined reduction in brake pipe to supply fluid under pressure from the auxiliary reservoir to both brake cylinders to effect an application of both sets of brakes to a certain degree and operative upon an increase in brake pipe pressure for releasing fluid under pressure from both brake cylinders to effect the release of both sets of brakes, an automatic brake valve device operative to an application position for venting fluid under pressure from the brake pipe and operative to a release position for increasing brake pipe pressure, a main reservoir, a signal pipe normally charged with fluid under pressure from said main reservoir to a normal pressure, means responsive to the pressure of fluid in said signal pipe conditionable while said brake valve device is in application position for operation upon an increase in signal pipe pressure above said normal pressure, when the brake valve device is moved to a release position, to effect the release of fluid under pressure from one of said brake cylinders to effect a release of one set of brakes and to supply fluid under pressure from the main reservoir to the other brake cylinder to increase the degree of application in said other brake cylinder above said certain degree, and manually operative means for effecting an increase in signal pipe pressure above the normal pressure.

46. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and operative upon an increase in brake pipe pressure for releasing fluid under pressure from both brake cylinders, a brake valve device operative to an application position for venting fluid under pressure from the brake pipe and operative to a release position for increasing brake pipe pressure, main reservoir, a signal pipe, self-lapping brake valve device automatically operative to supply fluid under pressure from the main reservoir to said signal pipe to charge the signal pipe to a certain normal pressure and to maintain the fluid in the signal pipe at said normal pressure, said self-lapping brake valve device being manually operative to supply fluid under pressure from the main reservoir to the signal pipe to increase the signal pipe pressure above said normal pressure, means subject to signal pipe pressure having a normal release position and operative to an application position upon an increase in signal pipe pressure, when the brake valve device is in release position, to effect the release of fluid under pressure from one of said brake cylinders to effect a release of one set of brakes and to effect a supply of fluid under pressure from the main reservoir to the other brake cylinder to increase the application above said certain degree.

47. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and operative upon an increase in brake pipe pressure for releasing fluid under pressure from both brake cylinders, a brake valve device operative to an application position for venting fluid under pressure from the brake pipe and operative to a release position for increasing brake pipe pressure, main reservoir, a signal pipe, a self-lapping brake valve device automatically operative to supply fluid under pressure from the main reservoir to said signal pipe to charge the signal pipe to a certain normal pressure and to maintain the fluid in the signal pipe at said normal pressure, said self-lapping brake valve device being manually operative to supply fluid under pressure from the main reservoir to the signal pipe to increase the signal pipe pressure above said normal pressure, means subject to signal pipe pressure having a normal release position and operative to an application position upon an increase in signal pipe pressure, when the brake valve device is in release position, to effect the release of fluid under pressure from one of said brake cylinders to effect a release of one set of brakes and to effect a supply of fluid under pressure from the main reservoir to the other brake cylinder to increase the application above said certain degree, said last mentioned means comprising a combined selector valve and a fluid pressure operated relay valve device.

48. In a fluid pressure brake system, an auxiliary reservoir, a brake pipe, two brake cylinders each operative by fluid under pressure to operate a separate set of brakes, means operative upon a reduction in brake pipe pressure to supply fluid under pressure from the auxiliary reservoir to both brake cylinders and operative upon an increase in brake pipe pressure for releasing fluid under pressure from both brake cylinders, a brake valve device operative to an application position for venting fluid under pressure from the brake pipe and operative to a release position for increasing brake pipe pressure, main reservoir, a signal pipe, a self-lapping brake valve device automatically operative to supply fluid under pressure from the main reservoir to said signal pipe to charge the signal pipe to a certain normal pressure and to maintain the fluid in the signal pipe at said normal pressure, said self-lapping brake valve device being manually operative to supply fluid under pressure from the main reservoir to the signal pipe to increase the signal pipe pressure above said normal pressure, valve means conditionable to establish a communication through which fluid under pressure is released from one of said brake cylinders to effect a release of one set of brakes, and another communication through which fluid under pressure is supplied from the main reservoir to the other brake cylinder to increase the brake application above said certain degree, and fluid pressure responsive means for conditioning the valve means while the brake valve device is in application position for operation, when the brake valve device is moved to a release position and the signal pipe pressure is increased above said normal pressure.

49. In a brake system, a plurality of motors each operating a separate brake, a train pipe normally charged with fluid under pressure to a predetermined degree, selector means operative automatically in response to variations in the pressure of fluid in a zone above said predetermined degree in a plurality of successive brake applying and releasing cycles to cause the motors to operate alternately to control the brakes, and a controller device operative to effect the operation of said selector means.

50. In a brake system, two motors each operating to a separate brake, a train pipe normally charged with fluid under pressure to a predetermined degree, means operative automatically in response to variations in the pressure of fluid in a zone above said predetermined degree in a plurality of successive brake applying and releasing cycles to cause first one and then the other of said motors to operate by turns to apply and release their separate brake, and a controller device operative to effect the operation of said selector means.

51. In a fluid brake system, two brake cylinders each operating a separate brake, valve means operative by fluid under pressure supplied thereto to admit fluid under pressure to one of said brake cylinders and operative upon the release of actuating fluid therefrom to effect the release of fluid under pressure from the brake cylinder, and being operative in response to a subsequent supply of fluid under pressure thereto to admit fluid under pressure to the other of said brake cylinders, a brake valve device having an application position for effecting the supply of fluid under pressure to and a release position for effecting the release of fluid under pressure from said valve means, and means operative automatically to indicate to the operator, when the brake valve device is in release position, when said brake valve may be returned to the application position to again supply fluid under pressure to the valve means without danger of maintaining said one brake cylinder applied.

52. In a fluid pressure brake system of the type having a train pipe normally charged with fluid under pressure to a predetermined degree, in combination, a first brake cylinder, a second brake cylinder, means adapted to be conditioned to at one time supply fluid under pressure to said first brake cylinder to apply one set of brakes and at the same time release fluid under pressure from said second brake cylinder to release another set of brakes, means responsive to an increase in pressure in said train pipe above said predetermined degree for conditioning said means, a brake valve device being automatically operative in one position to maintain said train pipe charged with fluid under pressure to said predetermined degree and manually operative to another position to increase the pressure in said train pipe above said predetermined degree, and means operative, in said one position of said brake valve device, to warn the operator against premature movement of the brake valve device to the other position.

BURTON S. AIKMAN.

CERTIFICATE OF CORRECTION.

Patent No. 2,302,486.  November 17, 1942.

BURTON S. AIKMAN.

It is hereby certified that error appears in the printed specification of the above numbered patent requiring correction as follows: Page 11, second column, line 21, claim 14, after "cylinder" insert --control--; and that the said Letters Patent should be read with this correction therein that the same may conform to the record of the case in the Patent Office.

Signed and sealed this 23rd day of February, A. D. 1943.

(Seal)

Henry Van Arsdale,
Acting Commissioner of Patents.